Feb. 28, 1928.

H. W. BOCKHOFF 1,660,372

COMBINED SPINDLE AND DRILL BUSHING PLATE

Filed March 12, 1924

Inventor
Harry W. Bockhoff.
By Attorney Albert F. Nathan.

Patented Feb. 28, 1928.

UNITED STATES PATENT OFFICE.

1,660,372

HARRY WILLIAM BOCKHOFF, OF RICHMOND, INDIANA, ASSIGNOR TO THE NATIONAL AUTOMATIC TOOL COMPANY, OF RICHMOND, INDIANA, A CORPORATION OF INDIANA.

COMBINED SPINDLE AND DRILL BUSHING PLATE.

Application filed March 12, 1924. Serial No. 698,700.

This invention deals with multiple drilling machines and relates more particularly to improved means for holding the drills and drill-spindles rigid during a drilling operation.

As commonly constructed machines of this character include a vertically movable drill-head carrying a plurality of rotatable drill-spindles each fitted with a suitable drill-point. Each of these spindles is rotatably mounted in a sleeve carried by an arm adjustably secured to the drill-head, whereby through adjustment of the arms, the spindles may be located in any desired positions, and a plurality of holes may be drilled by a single downward movement of the drill-head. The drill-spindles and the drills necessarily project a substantial distance below their supporting arms and, during a drilling operation, are subjected to certain strains which tend to flex the spindles and the drills out of their true positions with the result that imperfect work is produced.

This invention has for an object to provide means, independent of, but cooperating with, the spindle sleeves and their supporting arms, for preventing lateral displacement of the drills and drill-spindles when subjected to the strains incident to a drilling operation.

A further object of the invention is to provide means in the nature of bushing-plates engaging the drills and drill-spindles for holding the latter elements rigid, and so to support the bushing-plates on the movable head that one may have a further downward movement after the other has been brought to rest.

A still further object of the invention is to provide a drill bushing-plate to prevent flexing of the drills and to form such plate as a removable part of a drill-jig adapted to hold the work to be drilled.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1:
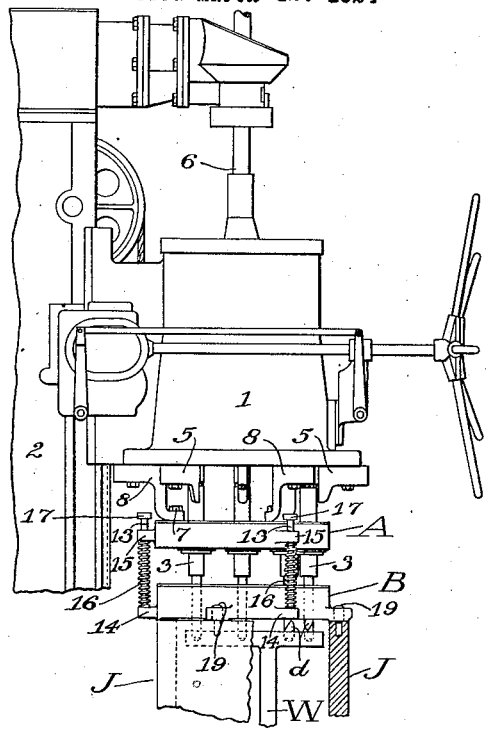
Figure 2:
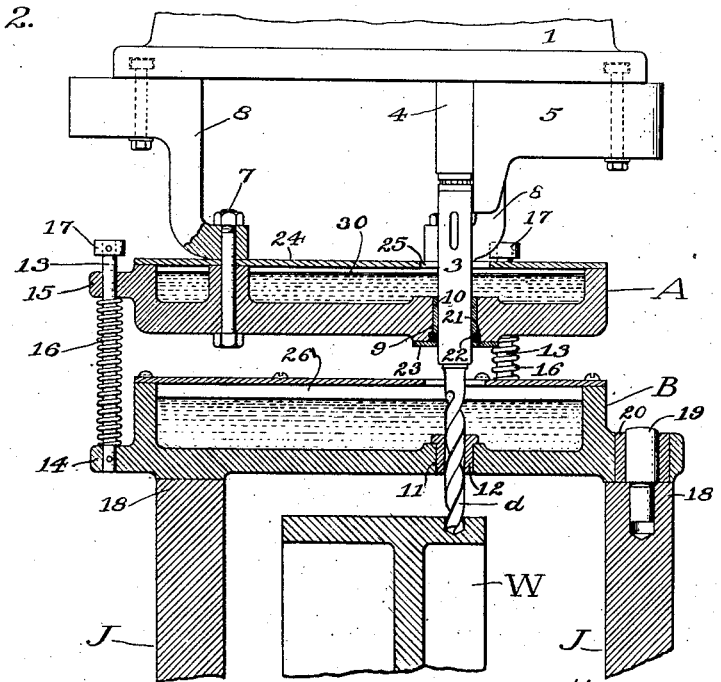

Fig. 1 is a side elevation of a portion of a multiple drilling machine embodying the present invention. Fig. 2 is an enlarged sectional view of a portion of Fig. 1 showing the drill-head and bushing-plates fitted for a single drill spindle and drill.

Referring more particularly to the drawings the invention is disclosed as embodied in a multiple drilling machine comprising the usual drill-supporting head 1, mounted for vertical bodily movement upon a suitable standard 2 and provided with a plurality of drill-supporting spindles 3. Each of the spindles is rotatably journaled in a sleeve 4 secured upon an arm 5 adjustably mounted upon the drill head 1 and has a universal joint connection with a suitable actuating shaft 6. Thus, as is common to these drilling machines, the spindles may be adjusted horizontally to any desired positions and in those positions are rotated to perform the usual drilling operations.

The free ends of the spindles and the drills $d$ carried thereby necessarily extend a substantial distance below their supporting arms and are subjected to certain lateral strains which have hertofore caused sufficient displacement of the drills to cause them to produce imperfect work.

This invention proposes means for bracing both the spindles and the drills whereby they are held rigid against these strains. A convenient means for accomplishing this result is disclosed in the drawings and consists of two bushing-plates A and B. The spindle bushing-plate A is preferably secured, as by bolts 7, to one or more bracket-arms 8 rigidly secured upon the underside of the drill-head, and is provided with a series of apertures 9 located in any formation to suit the work to be produced. Each of the apertures 9 is fitted with a bushing 10 which form bearings for the lower ends of the spindles. Thus it will be seen that as the spindles are journaled at their upper ends in the stationary sleeves 4 and at their lower ends in the fixed plate A, lateral deflection of the spindles is positively prevented.

The drill bushing-plate B acts in a manner similar to the plate A to prevent the drills $d$ from being deflected during a drilling operation. This latter plate is likewise formed with a series of apertures 11 located coaxially with the apertures 9 in the plate A and are fitted with bushings 12 forming bearings for the drills $d$. The plate B is preferably supported upon the plate A as by means of rods 13 fixed in lugs 14 on the former plate and having their upper ends slidingly fitted in lugs 15 formed integral with the plate A. Coil springs 16 surround the rods 13 and have their opposite ends bearing upon the adjacent faces of the lugs 14 and 15 thus normally acting to separate the plates A and B and hold the stop collars 17, secured to the rods 13, in contact with the lugs 15. The plate B preferably forms one part of a drill-jig J in which the work W may be held in the usual manner. The upwardly projecting walls 18 of the drill-jig are provided with dowel pins as 19 adapted to fit within bushings 20 carried by the plate B, thus insuring that the plate B and drills guided thereby will be positioned properly with respect to the base of the jig and the work secured therein. As the drill-head is lowered to bring the drills into contact with the work the plate B is brought to rest upon the walls 18 of the drill-jig. Further downward movement of the drill-head and the plate A causes the springs 16 to be compressed and the plate A to be moved downwardly on the rods 13. When the drilling is completed and the head is raised the plate B continues to rest on the jig until the lug 15 engages the collars 17 when further upward movements of the head acts to raise the plate B until it is lifted high enough to permit removal of the work from the jig. Inasmuch as the plate B is locked by means of the dowel pins 19, to the stationary jig during a drilling operation the latter member also assists the plate A in holding the plate B rigid thereby preventing deflection of the drills. The spindle bushing-plate is formed in its upper surface with a depression which provides a reservoir 30 within which is held suitable lubricant whereby the spindle bearings are kept well lubricated. Beneath the bushings 10 and within suitable cavities 21 are held packing rings 22 which form oil-tight joints and prevent leakage of the lubricant. These packing rings are held in place by means of cover plates 23. A cover-plate 24 closes the entire reservoir and is formed with apertures 25 for the passage of the drill spindles.

The drill bushing-plate B is also formed with a reservoir 26 for the reception of a suitable drill-coolant which gradually finds its way down the flutes of the drills and prevents heating thereof during a drilling operation. Any suitable means may be utilized for replenishing the coolant in the reservoir.

From the foregoing it will be observed that I have provided simple and efficient means which cooperate with the spindle adjusting arms to eliminate lateral displacement of both the drills and drill-spindles during a drilling operation.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. In a multiple drilling machine, in combination, a linearly movable drill-head providing a plurality of individual laterally adjustable bearings; a drill-spindle rotatably journaled in each of said bearings; drills secured in the lower ends of said spindles; unitary means independent of said bearings and carried by the head for holding the lower ends of said spindles; and means carried by the head for holding the lower ends of said drills against lateral displacement during a drilling operation.

2. In a drilling machine, in combination a linearly movable drill-head; a drill-spindle carried thereby; a drill carried by said drill-spindle; a support for the upper end of said drill-spindle carried by said drill-head; means rigidly carried by the drill-head and engaging said drill-spindle adjacent one end thereof to prevent deflection of said spindle; and means independent of said first named means for holding said drill against lateral deflection.

3. In a drilling machine, in combination, a linearly movable drill head providing a plurality of individual laterally adjustable bearings; a drill-spindle rotatably journaled in each of said bearings carried thereby; a drill carried by each of said spindles, supports for the upper ends of said spindles carried by said drill-head; a plate rigidly supported by said drill-head and formed with bearings for the lower ends of said spindles; and a second plate supported by said first plate and provided with bearings arranged coaxially with the bearings in said first mentioned plate to hold said drills against lateral deflection during a drilling operation.

4. An apparatus for drilling holes combining a linearly movable drill-head; a rotatable spindle carried thereby; a drill secured in said spindle; a sleeve in which said spindle is journaled, said spindle projecting substantially below said sleeve; means for securing said sleeve in adjusted positions in said drill-head; a bracket-arm fixed to said drill-head; a rigid plate carried by said bracket-arm and provided with a bearing for the projecting end of said spindle; a second plate supported upon said first named plate and provided with a drill-bearing in alignment with the spindle-bearing; and means permitting relative vertical movement between said plates, said plates and their aligned bearings affording means for holding said drill and drill-spindle against lateral deflection during a drilling operation.

5. An apparatus for drilling holes combining a drill-head; a plurality of drill-spindles rotatably carried thereby; a drill carried by each of said spindles; means carried by said drill-head for holding the upper ends of said spindles against lateral movement; bracket-arms carried by said drill-head; a first plate supported upon said bracket-arms and provided with a bearing for the lower end of each of said spindles; means including a lubricant reservoir formed in said plate for continuously lubricating said spindle-bearings; a second plate carried by said first plate and provided with a bearing for each of said drills; and means for continuously cooling said drills during a drilling operation, said means including a coolant reservoir formed in said second plate and surrounding said drill bearings and adapted to hold a coolant liquid through which the drills project.

6. An apparatus for drilling holes combining a drill-head; a plurality of drill-spindles rotatably carried by said drill-head and having their lower ends extending a substantial distance below said drill-head; a drill secured in the lower end of each of said spindles; a plate rigidly secured to said drill head and maintained spaced therefrom and provided with a series of apertures, one for each spindle; a bushing fitted in each of said apertures and forming a fixed bearing for the lower end of said spindle; a work-support; a drill supporting plate located intermediate said work-support and said spindle-bushing plate and provided with a bearing for each drill; and means connecting said drill-supporting plate with said work-support and with said spindle bushing plate to prevent relative lateral movement between said parts during a drilling operation.

7. An apparatus for drilling holes combining a drill-head; a plurality of drill spindles rotatably journaled therein and projecting a substantial distance therebelow; a drill carried by each of said spindles; supports for the upper ends of said drill-spindles carried by said drill-head; a fixed plate supported in spaced relation with said drill-head and provided with a bearing for each of said spindles; a plurality of lugs formed on said plate each provided with a bore; rods slidingly fitted in said bores; a collar fixed upon the upper end of each of said rods; a rigid plate fixed to the lower ends of said rods and provided with a bearing for each of said drills; coil springs surrounding said rods and interposed between said plates to normally separate said plates and maintain said collars in contact with said lugs; a work-support; and means for holding said work-support and said rigid plate against relative lateral movement during a drilling operation.

8. An apparatus for drilling holes combining a drill-head; a plurality of drill spindles rotatably journaled therein and projecting a substantial distance therebelow; a drill carried by each of said spindles; supports for the upper ends of said drill-spindles carried by said drill-head; a fixed plate supported in spaced relation with said drill-head and provided with a bearing for each of said spindles; a plurality of lugs formed on said plate each provided with a bore; rods slidingly fitted in said bores; a collar fixed upon the upper end of each of said rods; a rigid plate fixed to the lower ends of said rods and provided with a plurality of apertures and a bearing for each of said drills; coiled springs surrounding said rods and interposed between said plates to normally separate said plates and maintain said collars in contact with said lugs; a work-support provided with upstanding walls; and a plurality of dowel pins secured in said upstanding walls and fitted within said apertures for holding said work-support and said rigid plate against relative lateral movement during a drilling operation.

9. In a multiple drilling machine, the combination comprising a frame; a drill-head movable along said frame; a plurality of drill-spindles mounted on and supported by said head; means carried by the head for engaging the lower ends of the spindles to insure against their deflection during a drilling operation; drills secured in the lower ends of said spindles; guide means engaging said drills to insure against their deflection during a drilling operation; and means for supporting the guide means on said head to permit movement of the head independently of the guide means during a drilling operation.

In witness whereof, I hereunto subscribe my name.

HARRY WILLIAM BOCKHOFF.